US 12,083,868 B2

(12) United States Patent
Schürgers et al.

(10) Patent No.: US 12,083,868 B2
(45) Date of Patent: Sep. 10, 2024

(54) COMPOSITE PANE WITH FUNCTIONAL ELEMENT AND DEAERATION STRUCTURE INCORPORATED INTO A THERMOPLASTIC INTERMEDIATE LAYER

(71) Applicant: SAINT-GOBAIN GLASS FRANCE, Courbevoie (FR)

(72) Inventors: Christian Schürgers, Aachen (DE); Stephan Gillessen, Alsdorf (DE); Sebastian Arendt, Würselen (DE); Andrea Willms, Aachen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 17/774,748

(22) PCT Filed: Nov. 12, 2020

(86) PCT No.: PCT/EP2020/081889
§ 371 (c)(1),
(2) Date: May 5, 2022

(87) PCT Pub. No.: WO2021/104887
PCT Pub. Date: Jun. 3, 2021

(65) Prior Publication Data
US 2022/0371410 A1    Nov. 24, 2022

(30) Foreign Application Priority Data

Nov. 28, 2019   (EP) ..................................... 19212113

(51) Int. Cl.
*B32B 17/10*   (2006.01)
*B32B 3/30*    (2006.01)
(Continued)

(52) U.S. Cl.
CPC ................. *B60J 1/001* (2013.01); *B32B 3/30* (2013.01); *B32B 7/12* (2013.01);
(Continued)

(58) Field of Classification Search
CPC .............. B32B 3/263; B32B 17/10568; B32B 17/10036; B32B 17/10761;
(Continued)

(56) References Cited

U.S. PATENT DOCUMENTS 5,091,258 A    2/1992  Moran
5,246,764 A    9/1993  Laporte et al.
(Continued)

FOREIGN PATENT DOCUMENTS

CN         1196700 A     10/1998
CN       107848458 A      3/2018
(Continued)

OTHER PUBLICATIONS

Notice of Reasons for Refusal as issued in Japanese Patent Application No. 2022-530931, dated May 9, 2023.
(Continued)

*Primary Examiner* — Megha M Gaitonde
(74) *Attorney, Agent, or Firm* — Pillsbury Winthrop Shaw Pittman LLP

(57) ABSTRACT

A composite pane with at least one functional element, includes a first pane including an inner side III and an outer side IV, a second pane including an inner side II and an outer side I, a thermoplastic intermediate layer that joins the inner side III of the first pane laminarly to the inner side II of the second pane, at least one functional element that is incorporated into the thermoplastic intermediate layer, wherein the at least one functional element is directly adjacent the inner side III of the first pane and/or the inner side II of the second pane, and a deaeration structure is mounted at least (Continued)

Figure 1A:
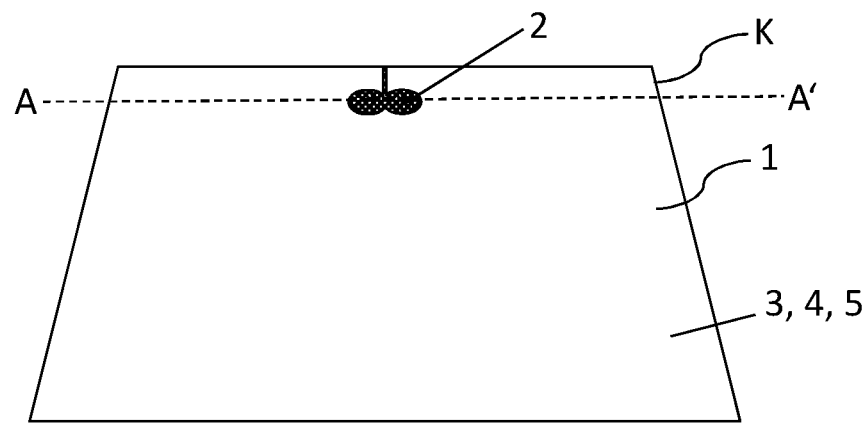

in the region of the functional element that is directly adjacent the first pane and/or second pane.

20 Claims, 2 Drawing Sheets

(51) Int. Cl.
    *B32B 7/12*     (2006.01)
    *B32B 38/00*     (2006.01)
    *B60J 1/00*     (2006.01)
(52) U.S. Cl.
    CPC .... *B32B 17/10036* (2013.01); *B32B 38/0008* (2013.01); *B32B 2250/02* (2013.01); *B32B 2307/732* (2013.01); *B32B 2310/0843* (2013.01); *B32B 2605/006* (2013.01)
(58) Field of Classification Search
    CPC ........ B32B 17/10779; B32B 17/10587; B32B 17/1055; B32B 27/22; B32B 27/30; B32B 27/08; B32B 27/306; B32B 2315/08; B32B 2329/06; B32B 2605/006; B32B 2605/08; B32B 3/02; B32B 3/08; B32B 3/18; B32B 3/22; B32B 3/266; B32B 3/30; C08J 5/18; C08J 2329/14; G02B 2027/012; G02B 27/01; B60J 1/001; B60J 1/02; B60K 2370/1529; Y10T 428/24479; Y10T 428/24612; Y10T 428/24942; Y10T 428/2495; Y10T 428/24959; Y10T 428/24495; Y10T 428/24537; Y10T 428/24562; Y10T 428/2457
    USPC ....... 428/156, 172, 212, 213, 214, 158, 163, 428/167
    See application file for complete search history.

(56) References Cited

U.S. PATENT DOCUMENTS

| | | | | |
|---|---|---|---|---|
| 5,346,569 | A | * | 9/1994 | Simon ............... B32B 17/10688 156/286 |
| 2004/0191482 | A1 | * | 9/2004 | Nakajima ......... B32B 17/10587 428/156 |
| 2004/0227462 | A1 | | 11/2004 | Utsumi et al. |
| 2008/0286530 | A1 | | 11/2008 | Smith |
| 2012/0026573 | A1 | | 2/2012 | Collins et al. |
| 2015/0343744 | A1 | * | 12/2015 | Ogawa .............. B32B 17/10761 219/201 |
| 2019/0248122 | A1 | | 8/2019 | Gillessen et al. |
| 2019/0299566 | A1 | | 10/2019 | Berard et al. |
| 2019/0299852 | A1 | | 10/2019 | Bauerle et al. |

FOREIGN PATENT DOCUMENTS

| | | |
|---|---|---|
| CN | 108136739 A | 6/2018 |
| CN | 109641423 A | 4/2019 |
| CN | 109874319 A | 6/2019 |
| CN | 110099875 A | 8/2019 |
| DE | 10 2008 026339 A1 | 12/2009 |
| EP | 0 876 608 B1 | 4/2002 |
| EP | 1 862 849 A1 | 12/2007 |
| EP | 2 462 007 B1 | 6/2016 |
| JP | 2006-525941 A | 11/2006 |
| JP | 2019-519423 A | 7/2019 |
| KR | 10-2019-0013855 A | 2/2019 |
| KR | 10-2019-0068572 A | 6/2019 |
| KR | 10-2019-0126310 A | 11/2019 |
| WO | WO 2010/112789 A2 | 10/2010 |
| WO | WO 2010/147494 A1 | 12/2010 |
| WO | WO 2011033313 A1 | 3/2011 |
| WO | WO 2012/007334 A1 | 1/2012 |
| WO | WO 2013/104438 A1 | 7/2013 |
| WO | WO 2013/104439 A1 | 7/2013 |
| WO | WO 2016/116372 A1 | 7/2016 |
| WO | WO 2017/097536 A1 | 6/2017 |
| WO | WO 2019/186507 A1 | 10/2019 |

OTHER PUBLICATIONS

International Search Report as issued in International Patent Application No. PCT/EP2020/081889, dated Jan. 11, 2021.
First Office Action and Search Report as issued in Chinese Patent Application No. 202080004106.2, dated Oct. 31, 2023.
Second Office Action and Search Report as issued in Chinese Patent Application No. 202080004106.2, dated Apr. 19, 2024.

* cited by examiner

COMPOSITE PANE WITH FUNCTIONAL ELEMENT AND DEAERATION STRUCTURE INCORPORATED INTO A THERMOPLASTIC INTERMEDIATE LAYER

CROSS-REFERENCE TO RELATED APPLICATIONS

This application is the U.S. National Stage of PCT/EP2020/081889, filed Nov. 12, 2020, which in turn claims priority to European patent application number 19212113.5 filed Nov. 28, 2019. The content of these applications are incorporated herein by reference in their entireties.

The invention relates to a composite pane with a functional element and deaeration structure incorporated into the thermoplastic intermediate layer of the composite pane, a method for producing the composite pane, and the use of the composite pane as a motor vehicle pane.

Modern glazing systems are equipped with a wide variety of electrically controllable functional elements, such as sensors, detectors, or receiver units. Examples of such functional elements, in particular in the automotive sector, include rain sensors, antennas, and capacitive touch sensors. These functional elements should usually be as inconspicuous as possible for the viewer and, if optically perceptible, be designed as attractively as possible. At the same time, the components must be protected against weathering and environmental influences.

EP 2 462 007 B1 describes a composite pane with an optically transparent sensor field and a sensor mounted in the region of the sensor field. The sensor is situated within an encapsulation that protrudes into the passenger compartment of a motor vehicle. This encapsulation is visible in the passenger compartment as an elevation on the pane and is perceived by the driver as potentially distracting and limiting the field of vision.

Depending on the type and size of the sensors necessary, they can even be inserted into the laminate of the composite pane. Thus, known from WO 2017/097536 is a light sensor that includes a photodiode and a circuit board and is inserted between a glass pane and the thermoplastic intermediate layer of the laminated composite pane adjacent thereto. The circuit board of the photodiode has no adhesion to the adjacent glass, as a result of which visually discernible air inclusions persist between these layers. This can be concealed by an opaque masking print.

An illuminated vehicle roof panel having diodes incorporated into its intermediate layer is known from US 2019/299852 A1.

WO 2016/116372 discloses a composite pane with a touch sensor in the form of a capacitive switching region for controlling any electrical loads in the vehicle, such as optically active switchable glazings. The capacitive sensor includes a patterned electrically conductive layer on a carrier film. The carrier film is inserted between two thermoplastic intermediate layers of the composite pane. This second additional ply of the thermoplastic intermediate layer is inserted into the pane composite substantially over the entire surface in order to keep the local differences in thickness as small as possible in the region of the sensors. This disadvantageously increases the total thickness of the thermoplastic intermediate layer.

WO 2019/186507 A1 discloses a composite pane comprising an inner pane, an outer pane, a thermochromic intermediate layer, and a thermoplastic intermediate layer made of a polyvinyl butyral film, wherein the polyvinyl butyral film is embossed to ensure improved deaeration. Such improved deaeration is thus possible in regions where the intermediate layer is present but not at direct contact surfaces between the thermochromic intermediate layer and one of the panes.

The object of the present invention is to provide a composite pane having a functional element laminated into the thermoplastic intermediate layer, wherein air inclusions in the region of the functional element are avoided and the total thickness of the composite pane is not significantly increased. The object of the invention is, moreover, to make available a method for producing such a composite pane.

The object of the present invention is accomplished according to the invention by a composite pane having a functional element and a deaeration structure incorporated into the thermoplastic intermediate layer according to independent claim 1. Preferred embodiments emerge from the subclaims.

The composite pane according to the invention having at least one functional element comprises at least a first pane, a second pane, and a thermoplastic intermediate layer between the first pane and the second pane. The first pane has an inner side III and an outer side IV. The second pane comprises an inner side II and an outer side I. The inner side III of the first pane is laminarly joined to the inner side II of the second pane via the thermoplastic intermediate layer, with the functional element incorporated into the thermoplastic intermediate layer. The functional element is inserted into the thermoplastic intermediate layer such that the at least one functional element is directly adjacent the inner side III of the first pane and/or the inner side II of the second pane. Accordingly, no thermoplastic intermediate layer is present between the functional element and at least one inner side of the pane. The total thickness of the composite pane is reduced by dispensing with an additional thermoplastic layer. A deaeration structure is mounted in this contact region between the functional element and the inner side of the first pane and/or the second pane. The deaeration structure prevents the functional element from resting with its entire surface against the inner side of the pane, i.e., the inner side II of the second pane and/or the inner side III of the first pane. The deaeration structure according to the invention improves the lamination of the composite pane, since the raised structure enables complete escape of air bubbles in the lamination process. An unstructured surface of a functional element, which, in turn, rests against an unstructured glass surface often results in only incomplete evacuation of the layer stack of the composite pane during the lamination operation. As a result, air bubbles are visible in the product which, on the one hand, are unacceptable in the optical appearance of the composite pane and, on the other, also lead to quality problems such as delamination. This can be avoided by means of the composite pane according to the invention having a functional element and deaeration structure.

The deaeration structure can comprise a wide variety of regular or irregular structures, with these preferably being aligned such that entrapped air bubbles can escape via the shortest path, i.e., in the direction of the nearest edge of the composite pane. In a preferred embodiment, the deaeration structure has a plurality of deaeration channels that run substantially perpendicular to the side edge nearest the functional element. In the context of the invention, a deaeration channel is a structure permeable to gases, whose length exceeds its width many times over. Due to the orientation of the deaeration channels substantially perpendicular to the nearest side edge, the deaeration channels are aligned along their width with an opening in the direction of the nearest side edge. During evacuation of the layer stack, this allows any existing air inclusions to escape along the deaeration channels directed toward the pane edge. The deaeration channels can run in a linear, curved, or even a meandering manner, with even more complex channel shapes having a primary running direction perpendicular to the nearest pane edge. Adjacent deaeration channels can optionally be connected to one another by short channel sections. This is advantageous for ensuring faster deaeration. Deaeration channels with a simple geometric structure can be implemented with little technical effort and are generally sufficient to ensure good deaeration.

The deaeration channels according to the invention preferably have a width of 0.5 mm to 5.0 mm, preferably 1.0 mm to 4.0 mm, for example, 3.0 mm. The width of the deaeration channels used is a function of the number of channels used, the geometric complexity of the functional element, and the thickness and rigidity of the functional element. With greater complexity and thickness of the functional element, an increasing tendency to form air inclusions is observed. In this case, the width of the deaeration channels can be increased to counteract this. The greater the number of channels introduced, the smaller the width of the individual channel can be.

In a preferred embodiment, the deaeration structure is implemented as a regular or irregular fracture structure. In this context, a fracture structure is a structure in which island-like regions are surrounded by interconnected deaeration paths. Such a fracture structure enables finely fragmented division of a surface into deaerated areas and intervening areas. One example of a regular fracture structure is a honeycomb structure. Deaeration structures in the form of a fracture structure enable further improved deaeration since the air inclusions can escape via the structure along the path of least resistance. When a fracture structure is used, the width of the deaeration paths of the fracture structure, defined by the average distance between adjacent islands, depends on the fineness of the structure. The finer the structure, the smaller the width of the deaeration paths can be. Generally, the width of the deaeration paths of a fracture structure is between 0.01 mm and 1.0 mm.

In a preferred embodiment of the deaeration structure, it comprises surface regions situated on a base surface and positioned higher relative to this base surface. This embodiment of the deaeration structure is applicable both for deaeration channels and for fracture structures. In the context of the invention, "higher-positioned surface region" refers to an area that runs offset by a positive amount in a direction relative to the base surface, wherein the base surface and the higher-positioned surface region run substantially parallel to one another. The base surface is usually provided by a surface of the functional element.

The amount by which the higher-positioned surface region is offset determines the distance between the base surface of the functional element and the adjacent pane surface. Preferably, the higher-positioned surface regions are offset in height relative to the base surface by at least 15 μm, particularly preferably by at least 30 μm, in particular by at least 50 μm. The higher-positioned surface regions can also be multilayered. The cross-section of the deaeration channels or the deaeration paths of a fracture structure increases with an increasing height offset of the higher-positioned surface region. The cross-section of the deaeration channels or deaeration paths is a function of, among other things, the number of deaeration channels or deaeration paths and the geometric complexity and thickness of the functional element. The smaller the number of deaeration channels or deaeration paths and the greater the thickness and complexity of the functional element, the greater the cross-section of the individual deaeration channels or deaeration paths should be. In addition to the amount of the height offset of the higher-positioned surface regions, the cross-section can also be influenced by the width of the individual deaeration channels or deaeration paths. Within the ranges mentioned, good results were achieved.

The higher-positioned surface regions preferably occupy an area proportion of at least 20%, particularly preferably at least 40%, in particular at least 50%, and, in each case, at most 80% of the total area of the functional element, consisting of the base surface and the higher-positioned surface regions. Within these ranges, particularly reliable deaeration is ensured.

The deaeration structure can be introduced on and/or in the functional element in a wide variety of ways. The deaeration structure is preferably applied additively on the functional element or introduced subtractively into the functional element. The deaeration structure is provided between the surfaces between which the entrapment of air is to be prevented. The deaeration structure can, for example, also be mounted on the inner side III of the first pane and/or the inner side II of the second pane. This is advantageous in terms of a simple application of the deaeration structure. For example, the deaeration structure can already be applied to the panes during their production such that the functional element merely has to be placed in the appropriate region. The pane surface to which the deaeration structure is to be applied depends on the positioning of the functional element. Whether the functional element is to be arranged adjacent the first pane or the second pane depends on the type and use of the functional element and is apparent to the person skilled in the art. In the case of a functional element that is directly adjacent both panes, a deaeration structure can also be provided on both pane surfaces. In such an embodiment, the thermoplastic intermediate layer has a cutout into which the functional element is inserted. Preferably, however, the functional element is adjacent only one of the inner sides of the first pane or of the second pane, whereas the opposite surface of the functional element contacts a section of the thermoplastic intermediate layer. In this case, the thermoplastic intermediate layer can be introduced into the layer stack over its entire surface. This is advantageous in terms of a mechanically stable connection of the functional element.

In a particularly preferred embodiment, the deaeration structure is applied additively or subtractively on the functional element, the functional element is inserted directly adjacent one of the inner sides of the pane, and is adjacent a section of the thermoplastic intermediate layer at the opposite surface of the functional element. This has the advantage that the functional element can already be provided with a deaeration structure; and, when the functional element is inserted into the layer stack of the composite pane, insertion errors that can occur due to non-congruent positioning of the functional element and the deaeration structure can be avoided. The deaeration structure is mounted at least on the surface of the functional element that is directly adjacent the inner side of the first pane of the second pane. In addition to this, the deaeration structure can also be mounted on the opposite surface of the functional element oriented toward the thermoplastic intermediate layer. This also improves the deaeration between these aforementioned layers.

In a first preferred embodiment, the deaeration structure is applied additively by printing methods, preferably screen printing methods or ink printing methods. Printing methods are suitable for the application of a deaeration structure a wide variety of materials, with the material of the surface to be printed decisive for the selection of the printing method. Screen printing methods are, for example, well suited for printing on glass surfaces or even polymeric materials. Particularly preferably, the deaeration structure is applied by ink printing methods. These are suitable for printing on polymeric materials and also, depending on the inks used, for printing on glass.

Printing inks comprising synthetic resin lacquers are preferably used for printing the deaeration structure. In tests by the inventors, it has been shown that printing inks that are used in the electronics industry for printing printed circuit boards are generally well suited. The printing inks used preferably contain synthetic resin varnishes, particularly preferably epoxy resin lacquers. By way of example, suitable printing inks include thermally curing 2-component epoxy resin lacquers. These can be processed using both screen printing and inkjet printing.

If the deaeration structure is applied on glass surfaces, for example, on the inner side of the first pane and/or the inner side of the second pane, the printing inks commonly used for the opaque masking print in the edge region of windshields can also be used.

In a second preferred embodiment, a deaeration structure is subtractively applied to the functional element. This case, a selective removal of material is carried out at the surface of the functional element, with deaeration channels or deaeration paths formed in the regions with material removal, the bottom surface of which forms the base surface of the deaeration structure. The regions between the deaeration channels or deaeration paths, where no material removal occurs, form the surface regions positioned higher relative to the base surface. Depending on the material of the functional element, various possibilities for selective material removal are known to the person skilled in the art. For example, methods such as etching, grinding, or engraving can be used. The inventors have found that a particularly effective automatable material removal by laser methods is possible. Particularly preferably, the deaeration structure is created by means of a $CO_2$ laser.

Alternatively, the deaeration structure can also be created by means of a combination of additive and subtractive methods. The additive methods and subtractive methods can be applied both to the same surface and to different surfaces.

The deaeration structure according to the invention can be used for integrating a large number of different functional elements since it can be applied on the functional element independently of the function and nature of the functional element. The electrically switchable functional element can assume a wide variety of designs known to the person skilled in the art. Preferably, the functional element is an electrically switchable functional element, particularly preferably an antenna, a sensor, a switching element, an electrical connection element, an electrical bus bar, an SPD, a PDLC, an electrochromic, or an electroluminescent functional element. The composite pane according to the invention can also have multiple electrically switchable functional elements, which can also be of different design and function.

In a particularly preferred embodiment, the functional element has a thickness of at least 50 μm, preferably at least 100 μm, in particular at least 150 μm. The thickness of the functional element is determined without taking the deaeration structure into account. It is also possible to apply the invention to functional elements of lower thickness; however, the quality problems described due to air inclusions occur more frequently with increasing thickness of the functional element to be inserted. The functional elements used with a deaeration structure in the context of the invention typically have a thickness of 50 μm to 250 μm. In this regard, it is advantageous to dispense with an additional laminating film that is locally limited to the functional element, since this would increase the risk of undesirable stress cracks due to excessively high local differences in thickness of the composite pane. The deaeration structure according to the invention makes this possible, since the entrapment of air is prevented even in the case of direct contact between the functional element and the inner side of at least one pane.

Particularly preferably, the invention is used to integrate an antenna arrangement in a composite pane. Examples of antenna arrangements in composite panes are known in the prior art. A wide variety of designs are possible, depending on the function and field of application of the antenna. The individual designs differ in particular in their geometric complexity and thickness. These factors are decisive for whether and to what extent quality problems occur in the laminating operation due to air inclusions.

The composite pane according to the invention is, in particular, suitable for integrating so-called Vivaldi antennas, also known as tapered slot antennas (TSAs). Vivaldi antennas in composite panes can be used, for example, for receiving mobile phone signals. Referred to as Vivaldi antennas are coplanar broadband antennas for the microwave range that consist, for example, of a solid metal sheet, a printed circuit board, or a dielectric layer metallized on one or both sides. Preferably used in the composite pane according to the invention are Vivaldi antennas comprising a dielectric layer with at least one metallic electrically conductive layer on at least one of the surfaces of the dielectric layer. These can be readily integrated into composite panes due to their small overall height. However, compared to the usual functional elements used in the prior art, Vivaldi antennas are significantly thicker, with a thickness of, for example, 220 μm. The use of the deaeration structure according to the invention thus significantly simplifies the integration of these components.

A Vivaldi antenna as a functional element comprises, for example, a non-thermoplastically melting carrier film as a dielectric layer. The non-thermoplastically melting carrier film forms a barrier and impedes the escape of air in the deaeration process. It exhibits no adhesion at all to glass or no air release capacity, as a result which air inclusions occur between the carrier film and an adjacent glass pane. Here, the invention provides a remedy. The electrically conductive layer of the Vivaldi antenna is applied on the non-thermoplastically melting carrier film, using methods known to the person skilled in the art, for instance, sputtering. Suitable Vivaldi antennas comprising an electrically conductive layer on a carrier film are commercially available. Vivaldi antennas are characterized by the ease of their manufacture and their broadband capability. The actual antenna can be seen as a two-dimensional exponential horn that causes directional radiation of a linearly polarized electromagnetic wave. A Vivaldi antenna is usually divided into two mutually identical sub-regions, with a slotted line between them. The two sub-regions of the antenna are preferably arranged at an angle of 180° relative to one another, but can also assume angles deviating from this, with the arrangement of the two sub-regions relative to one another usually mirror-symmetric to a mirror plane running along the slotted line.

In another possible embodiment of the invention, the electrically switchable functional element is a sensor, for example, a touch sensor or a rain sensor. The sensor includes a carrier film with an electrically conductive coating, wherein in the electrically conductive coating, at least one capacitive switching region is isolated from the electrically conductive coating by at least one coating-free separating line. The capacitive switching region has a touch region, a supply line region, and a connection region. The supply line region electrically connects the touch region to the connection region, making the connection region electrically connectable to a sensor electronics system. The switching region is a capacitive switching region, in other words, it is specially designed for capacitive contact detection. In an advantageous embodiment, the switching region forms a surface electrode. The capacitance of the surface electrode is measured via an external capacitive sensor electronics system. The capacitance of the surface electrode changes against ground when a body (for example, a human body), comes into its vicinity or, for example, touches an insulator layer above the surface electrode. The insulator layer comprises, in particular, one pane of the composite pane as such. The capacitance change is measured by the sensor electronics system and when a threshold value is exceeded, a switching signal is triggered. The switching region is determined by the shape and size of the surface electrode. The region of the electrically conductive layer that is arranged outside the capacitive switching region and is electrically isolated therefrom by the separating line, is referred to as "surrounding region". The surrounding region can be connectable to the sensor electronics system via an additional connection region.

The composite pane according to the invention can further include an electrical connection element or an electrical bus bar. Electrical connection elements and bus bars are used to connect electrically conductive structures, for example, electrically conductive layers as heatable coatings or heating wires, to an external power source. The electrical connection is made via so-called bus bars, for example, strips of an electrically conductive material or electrically conductive imprints to which the electrically conductive structures of the composite pane are connected. The bus bars serve to transfer electrical power and enable homogeneous voltage distribution. The bus bars are advantageously produced by printing a conductive paste. The conductive paste preferably contains silver particles and glass frits. The layer thickness of the conductive paste is preferably from 5 µm to 20 µm. In an alternative embodiment, thin and narrow metal foil strips or metal wires are used as bus bars, which preferably contain copper and/or aluminum; in particular, copper foil strips with a thickness of, for example, approx. 50 µm are used. The width of the copper foil strips is preferably 1 mm to 10 mm. The electrical contact between a conductive structure of the composite pane and the bus bar can be produced, for example, by soldering or by gluing with an electrically conductive adhesive. The electrical contacting between an electrical connection cable and a bus bar can be done either indirectly via electrical connection elements or directly. Electrical connection elements are used to achieve the best possible connection to the bus bar in terms of mechanical stability of the connection and minimization of an undesirable voltage drop. Suitable means for electrically conductively fixing the contact element to the bus bar are known to the person skilled in the art, for example, by soldering or gluing by means of a conductive adhesive. The connection elements themselves are usually made of conductive metals, such as copper, silver, nickel, chromium-containing steels, and/or alloys thereof.

The functional elements mentioned, i.e., antennas, sensors, connection elements, and bus bars, are typically placed outside the through-vision region of the pane. In the automotive sector, and, in particular, in the case of windshields, an opaque masking print in the edge region is common, which is accordingly placed as required to also conceal these functional elements. In the case of functional elements mounted outside the field of vision, the deaeration structure can be made without regard to the visual appearance. Thus, in this case, both subtractive methods, such as laser ablation, and printing methods are equally suitable.

In contrast, for functional elements provided in the field of vision of a composite pane, the visual appearance must be taken into account. In this case, subtractive methods, such as laser ablation, are preferred. Functional elements arranged in the field of vision of a composite pane include, for example, SPD, PDLC, electrochromic, or electroluminescent functional elements. These contain an active layer with electrically controllable optical properties that is arranged between two carrier films. The carrier films are usually made of a non-thermoplastically melting material that does not adhere to glass surfaces.

An SPD (suspended particle device) functional element contains an active layer comprising suspended particles, with the absorption of light by the active layer being variable by application of a voltage to the surface electrodes. The change in absorption is based on the alignment of the rod-shaped particles in the electric field when electric voltage is applied. SPD functional elements are known, for example, from EP 0876608 B1 and WO 2011033313 A1.

A PDLC (polymer dispersed liquid crystal) functional element contains an active layer including liquid crystals that are incorporated into a polymer matrix. When no voltage is applied to the surface electrodes, the liquid crystals are oriented in a disorderly manner, resulting in strong scattering of the light passing through the active layer. When a voltage is applied to the surface electrodes, the liquid crystals align themselves in one common direction and the transmittance of light through the active layer is increased. Such a functional element is known, for example, from DE 102008026339 A1.

In an electrochromic functional element, the active layer of the functional element is an electrochemically active layer. The transmittance of visible light depends on the rate of ion storage in the active layer, with the ions provided, for example, by an ion storage layer between an active layer and a surface electrode. The transmittance can be influenced by the voltage applied to the surface electrodes, causing a migration of the ions. Suitable functional layers contain, for example, at least tungsten oxide or vanadium oxide. Electrochromic functional elements are known, for example, from WO 2012007334 A1, US 20120026573 A1, WO 2010147494 A1, and EP 1862849 A1.

In electroluminescent functional elements, the active layer contains electroluminescent materials, in particular organic electroluminescent materials whose luminescence is stimulated by the application of a voltage. Electroluminescent functional elements are known, for example, from US 2004227462 A1 and WO 2010112789 A2. The electroluminescent functional element can be used as a simple light source or as a display with which any representations can be shown.

If the functional elements used include a carrier film, it is preferably transparent and preferably contains or is made of a polyethylene terephthalate (PET) film. The thickness of the carrier film is preferably from 0.025 mm to 0.3 mm.

The thermoplastic intermediate layer of the composite pane comprises at least one first laminating film and, optionally, one or more second laminating films. The first laminating film can, if need be, be composed of a plurality of individual, congruent, full-surface thermoplastic films. This is, for example, advantageous when the desired thickness of the first laminating film is an integer multiple of the thickness of a commercially available film with a standard thickness. The first laminating film and the second laminating film are thermoplastic films that are suitable for producing for an adhesive bond to one another and to adjacent panes and/or to adjacent functional elements. During the lamination operation, the laminating films begin to flow under the action of heat, as a result of which they adhere to adjacent elements and are bonded thereto and to one another. Preferably, the first and the second laminating films contain polyvinyl butyral (PVB), ethylene vinyl acetate (EVA), and/or polyurethane (PU). These materials are common for the thermoplastic intermediate layer of composite panes and produce an adhesive bond to glass. Thus, a good bond is ensured. In the composite pane as a finished laminated end product, the individual films remain identifiable as such despite melting during the lamination operation. In particular, the material flows at the edges of the films during the lamination operation; however, complete mixing does not occur such that in the product, the individual film sections and their composition are still detectable.

The inner side of the first pane of the composite glass according to the invention is the surface of the first pane turned in the direction of the thermoplastic intermediate layer, while the outer side of the first pane is oriented, in the installed position, toward the vehicle interior or building interior. The inner side of the second pane is likewise oriented toward the thermoplastic intermediate layer; whereas, in contrast, the outer side of the second pane points toward the external environment. The thermoplastic intermediate layer comprising the first laminating film, and, optionally, one or more second laminating films, joins the inner side of the first pane to the inner side of the second pane. The terms "first pane" and "second pane" arbitrarily describe two different panes. In particular, the inner pane can be referred to as a first pane; and the outer pane, as a second pane. In the context of the invention, if the composite pane is intended, in a window opening of a vehicle or a building, to separate an interior space from the external environment, "inner pane" refers to the pane (first pane) facing the interior (vehicle interior). "Outer pane" refers to the pane (second pane) facing the external environment. However, the invention is not limited to this.

The first laminating film and/or the second laminating films have in each case a thickness of 0.30 mm to 1.5 mm, preferably 0.35 mm to 1.0 mm, particularly preferably 0.35 mm to 0.86 mm. PVB films are, for example, marketed in standard thicknesses of 0.38 mm and 0.76 mm.

The deaeration structure according to the invention is used in particular for small-area functional elements. With these, a functional element can be mounted in the immediate vicinity of a pane without taking into account mechanical properties of the composite pane, without using an intervening laminating film. The invention is typically used with functional elements with an area proportion of 0.5% to 10%, preferably 1% to 5%, for example, 2.5% of the total glazing area. The edge length of the functional elements is generally a maximum of 20 cm×20 cm, preferably a maximum of 15 cm×15 cm, particularly preferably a maximum of 10 cm×10 cm. The glazing region with a thickness increased locally due to the functional element thus extends over a comparatively small area of the glazing such that the risk of glass breakage is also minimized as a result.

The composite pane can, for example, be the windshield or the roof panel of a vehicle or another vehicle glazing, for example, a partition pane in a vehicle, preferably in a rail vehicle or a bus. Alternatively, the composite pane can be an architectural glazing, for example, in an exterior façade of a building or a partition pane in the interior of a building.

The composite pane according to the invention contains a functional element that is arranged between a thermoplastic intermediate layer and a pane surface, at least in some sections. The thermoplastic intermediate layer usually has the same dimensions as the first and the second pane.

In an advantageous embodiment, the composite pane according to the invention is a windshield of a motor vehicle. This comprises an engine edge, which is adjacent the engine hood in the installed position of the composite pane in the vehicle body, and a roof edge, which is adjacent the vehicle roof in the installed position. The engine edge and the roof edge form two pane edges opposite one another. Two opposing side edges, which are adjacent the so-called A-pillars of the body in the installed position of the windshield, extend between the engine edge and the roof edge.

The first and the second pane contain glass and/or transparent plastics. The first pane and/or the second pane particularly preferably contain flat glass, float glass, quartz glass, borosilicate glass, soda lime glass, or clear plastics, preferably rigid clear plastics, in particular polycarbonate, polymethylmethacrylate, and/or mixtures thereof. Preferably, the panes are made of glass. In principle, any further panes can be arranged on the outer sides of the first and the second pane and joined to them by lamination with the interposition of thermoplastic films or also by spacers in the case of insulating glazing. The first pane and/or the second pane are preferably transparent, in particular for the use of the pane as a windshield or rear window of a vehicle or other uses in which high light transmittance is desired. In the context of the invention, "transparent" means a pane that has transmittance greater than 70% in the visible spectral range. For panes that are not in the traffic-relevant field of vision of the driver, for example, for roof panels, the transmittance can, however, also be much lower, for example, greater than 5%.

The thickness of the first pane and/or of the second pane is between 0.3 mm and 25 mm, with the pane thickness highly dependent on the application of the pane.

Particularly in the automotive sector, there has been in recent years a trend toward increasingly lower glass thicknesses, enabling savings in terms of vehicle weight. The pane thicknesses of an automobile glazing, in particular a windshield are, for the inner pane, usually in the range from 0.3 mm to 2.5 mm; and, for the outer pane, in the range from 0.8 mm to 2.5 mm. An asymmetric thickness combination, in which the thickness of the outer pane is greater than the thickness of the inner pane, is, especially with a low total thickness, advantageous in terms of improved stability of the composite pane. Whether the outer pane or the inner pane of the automobile glazing corresponds in its nomenclature to the first or to the second pane in the context of the invention depends on the positioning of the functional element in the intermediate layer.

In a preferred embodiment, the composite pane is a windshield, wherein the thickness of the outer pane is between 0.8 mm and 2.1 mm and the thickness of the inner pane is between 0.5 mm and 1.8 mm.

Windshields have a central field of vision, the optical quality of which is subject to high requirements. The central field of vision must have high light transmittance (typically greater than 70%). Said central field of vision is, in particular, that field of vision that is referred to by the person skilled in the art as field of vision B, vision area B, or zone B. The field of vision B and its technical requirements are specified in Regulation No. 43 of the Economic Commission for Europe of the United Nations (UN/ECE) (ECE-R43, "Uniform Provisions concerning the Approval of Safety Glazing Materials and Their Installation on Vehicles"). There, the field of vision B is defined in Annex 18.

In another preferred embodiment of the invention, the composite pane is a roof panel of a motor vehicle, wherein the thickness of the outer pane is between 1.1 mm and 2.1 mm and the thickness of the inner pane is between 0.5 mm and 2.1 mm. Here, both symmetric and asymmetric glazings are possible. In a preferred embodiment, the roof panel has a symmetric structure wherein the outer and the inner glass have the same thickness, for example, 2.1 mm and 2.1 mm.

The composite glass is, in its embodiment as a vehicle glazing, preferably bent in one or more spatial directions, as is customary for motor vehicle panes, with typical radii of curvature in the range from approx. 10 cm to approx. 40 cm. The composite glass can, however, also be flat, for example, when it is intended as a pane for buses, trains, tractors, or as building glazing.

The first pane and/or the second pane can be thermally or chemically tempered, partially tempered, or non-tempered.

The composite glass can also be provided with an additional function, in that the thermoplastic intermediate layer has functional inclusions, for example, inclusions with IR absorbing, IR reflecting, UV absorbing, coloring, or acoustic properties. The inclusions are, for example, organic or inorganic ions, compounds, aggregates, molecules, crystals, pigments, or dyes.

In particular with use of the composite pane according to the invention in vehicles, for example, as a windshield, it is advantageous to implement further functions in order to reduce the negative effects of weathering influences such as strong solar radiation or ice formation. For this, so-called low-E coatings and/or heatable coatings can be applied to the inner side of the inner pane or of the outer pane. Suitable material compositions of an electrically heatable coating that also functions as a low-E coating can be found, for example, in WO 2013/104439 and WO 2013/104438.

The invention is further accomplished by a method for producing a composite glass according to the invention, wherein
  a) at least one deaeration structure is applied additively or subtractively on a functional element,
  b) a layer stack at least comprising a first pane, the functional element having a deaeration structure, a thermoplastic intermediate layer, and a second pane is formed, wherein the deaeration structure is directly adjacent the inner side of the first pane and/or the inner side of the second pane,
  c) the layer stack from step b) is laminated to form a composite pane, wherein the inner side of the first pane and the inner side of the second pane are bonded via the thermoplastic intermediate layer.

In a preferred embodiment of the method according to the invention, the deaeration structure is applied additively in step a) by printing methods, preferably by means of screen printing methods or inkjet printing methods.

In another preferred embodiment of the method according to the invention, the deaeration structure is introduced into the functional element subtractively in step a) by means of laser methods, preferably by means of a $CO_2$ laser.

If the composite glass is to function as bent vehicle glazing, at least the pane used as the outer pane is subjected to a bending process prior to lamination. In a preferred embodiment, the pane used as the inner pane is also subjected to a bending process. This is, in particular, advantageous in the case of strong bends in multiple spatial directions (so-called three-dimensional bends).

Alternatively, the pane used as the inner pane is not pre-bent. This is particularly advantageous in the case of panes with very low thicknesses since they have film-like flexibility and can thus be adapted to the pre-bent outer pane without having to be bent themselves.

The first and the second pane can be bent individually. Preferably, the panes are congruently bent together (i.e., simultaneously and by the same tool) since, thus, the shape of the panes is optimally matched to each other for the subsequent lamination.

The bonding of the first pane and the second pane in step c) is preferably done under the action of heat, vacuum, and/or pressure. Methods known per se for producing a composite pane can be used.

For example, so-called autoclave methods can be carried out at an elevated pressure of approx. 1 bar to 15 bar and temperatures from 110° C. to 145° C. over approx. 2 hours. Vacuum bag or vacuum ring methods known per se operate, for example, at approx. 50 mbar and 80° C. to 130° C. The first pane, the thermoplastic intermediate layer, and the second pane can also be pressed in a calender between at least one pair of rollers to form a pane. Systems of this type for producing panes are known and normally have at least one heating tunnel upstream before a pressing facility. The temperature during the pressing operation is, for example, from 40° C. to 150° C. Combinations of calender and autoclave processes have particularly proven their worth in practice. Alternatively, vacuum laminators can be used. These consist of one or a plurality of heatable and evacuable chambers, in which the first pane and the second pane are laminated within, for example, approx. 60 minutes at reduced pressures of 0.01 mbar to 800 mbar and temperatures from 80° C. to 170° C.

Another aspect of the invention includes the use of the composite pane according to the invention as vehicle glazing, in particular as a windshield, rear window, side window, or roof panel.

In the following, the invention is explained in detail with reference to drawings and exemplary embodiments. The drawings are schematic representations and not true to scale. The drawings in no way restrict the invention.

Figure 1B:
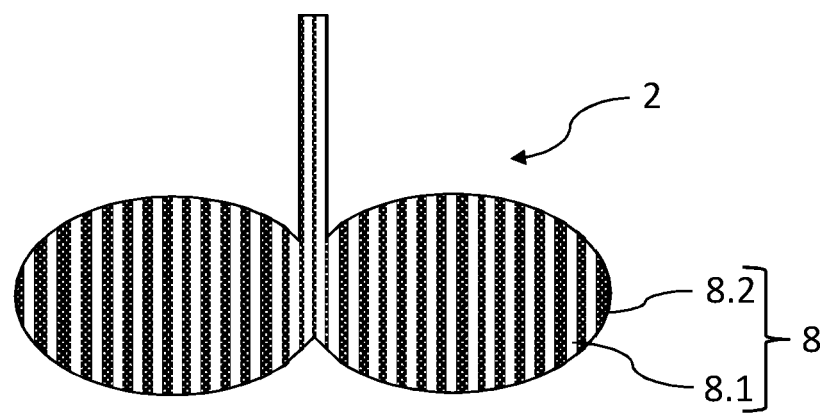
Figure 1C:
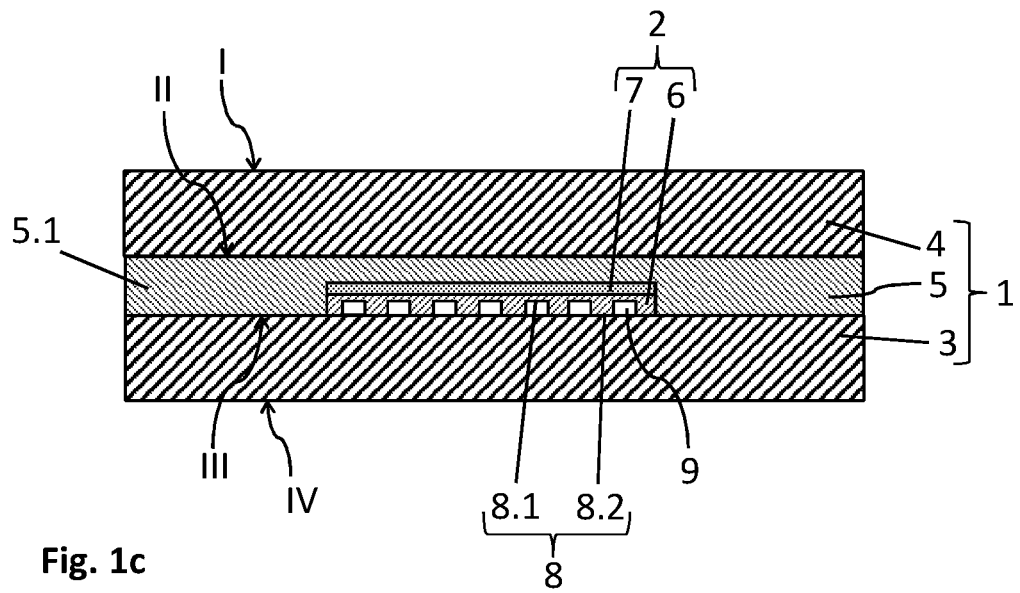
Figure 2:
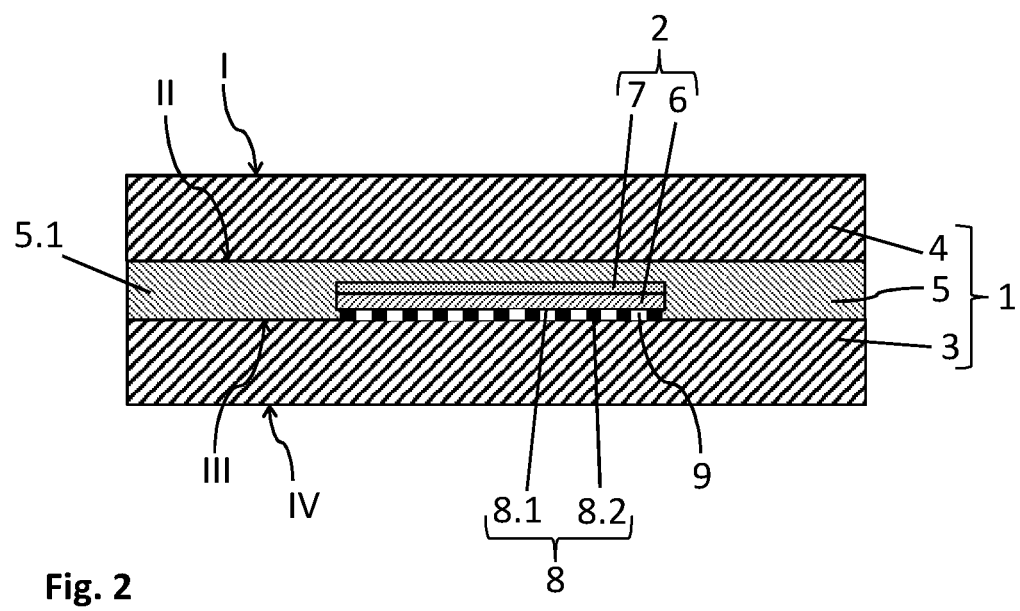

They depict:

FIG. 1a a plan view of a composite pane 1 according to the invention with a functional element 2, wherein the composite pane 1 is laminated laminarly with a thermoplastic intermediate layer 5 and a Vivaldi antenna is incorporated as a functional element 2, FIG. 1b a detail of the functional element 2 of FIG. 1a, wherein the detail depicts the deaeration structure 8, FIG. 1c a cross-section through the composite pane 1 in the region of the functional element 2 along the section line AA' of FIG. 1a, FIG. 2 another embodiment according to the invention of the composite pane 1 depicted along the section line AA', analogous to FIG. 1c.

FIG. 1a depicts a plan view of a composite pane 1 according to the invention having a Vivaldi antenna as a functional element 2, wherein the composite pane 1 is laminarly laminated with thermoplastic intermediate layer 5. FIG. 1b depicts a detail of the functional element 2 laminated into the composite pane 1 of FIG. 1*a* with deaeration structure 8. FIG. 1*c* shows a cross-section through the composite pane 1 of FIG. 1*a* in the region of the functional element 2, wherein the cross-section is cut along the section line AA'. The composite pane 1 is intended for use as a windshield of a motor vehicle and comprises a first pane 3, which, here, is the inner pane of the windshield, and a second pane 4 (here: outer pane of the windshield). The panes 3, 4 are laminated to one another via a thermoplastic intermediate layer 5. The thermoplastic intermediate layer 5 consists of a first laminating film 5.1, which is applied full-surface between the panes 3, 4. The first pane 3 has an outer side IV and an inner side III. The second pane 4 has an inner side II and an outer side I. The thermoplastic intermediate layer 5 joins the inner side III of the first pane 3 and the inner side II of the second pane 4. The second pane 4 and the first pane 3 are made of soda lime glass. The first laminating film 5.1 is a thermoplastic film, here, a polyvinyl butyral film with a thickness of 0.76 mm measured before the lamination operation. The layer sequence of the composite pane 1 in the region outside the functional element 2 consists according to FIG. 1*c* of the first pane 3, the first laminating film 5.1, and the second pane 4. This is particularly advantageous since by using only a single film element, the structure is reduced to the essential, no slippage of film plies against one another occurs during the production process, and a weight reduction is obtained compared to full-surface multiple-ply intermediate layers. In the region of the functional element 2, the layer sequence of the composite pane 1 consists of the first pane 3, the functional element 2 placed on the inner side III of the first pane 3, the first laminating film 5.1, and, finally, the second pane 4, whose inner side II rests against the first laminating film 5.1. The functional element 2 includes a carrier film 6 and an electrically conductive structure 7 arranged thereon. The deaeration structure 8 is introduced into the carrier film 6 of the functional element 2 subtractively by means of a $CO_2$ laser. In the embodiment of FIG. 1*c*, the deaeration structure 8 is implemented in the form of deaeration channels that extend perpendicular to the nearest pane edge K of the composite pane 1. This ensures the escape of air bubbles over the shortest path. The deaeration structure 8 comprises a base surface 8.1, which is situated in the regions where material ablation by laser occurred. Higher-positioned surface sections 8.2 of the deaeration structure 8 are situated substantially parallel to the base surface 8.1. The higher-positioned surface sections 8.2 correspond, in the embodiment of FIG. 1*c*, to the surface of the carrier film 6 facing away from the electrically conductive structure 7. The base surface 8.1 forms the bottom surface of the deaeration channels 9. The deaeration channels 9 have a width of 3.0 mm (distance of adjacent higher-positioned surface regions 8.2 from one another), a depth of 100 µm (distance of the base surface 8.1 from the higher-positioned surface regions 8.2), and a distance of 2.0 mm from one another. The functional element 2 has a total thickness of 215 µm. The deaeration structure 8 of the functional element 2 enables good evacuation of the layer stack before lamination of the composite pane such that no air inclusions at all occur in the vicinity of the functional element. The appearance and the stability of the composite pane are thus significantly improved. Introduction of the deaeration structure 8 by material ablation has the advantage that the total thickness of the functional element 2 remains constant.

FIG. 2 depicts another embodiment according to the invention of the composite pane 1, wherein FIG. 2 shows a cross-section through a composite pane analogous to the section line AA' depicted in FIG. 1*a*. The basic structure corresponds to that shown in FIG. 1*c*. In contrast to the embodiment of FIG. 1*c*, the deaeration structure in FIG. 2 is applied additively. The deaeration structure 8 is likewise provided in the form of deaeration channels 9, wherein the base surface 8.1 of the deaeration structure 8 is formed by the surface of the carrier film 6 facing away from the electrically conductive structure 7. The higher-positioned surface regions 8.2 of the deaeration structure 8 are formed by lines applied by means of inkjet printing methods. Application of the deaeration structure by printing methods is technically feasible by simple means. The functional element 2 has, measured without the deaeration structure 8, a total thickness of 215 µm. The deaeration channels 9 have a width of 3.0 mm (distance of adjacent higher-positioned surface regions 8.2 from one another), a depth of 100 µm (distance of the base surface 8.1 from the higher-positioned surface regions 8.2), and a distance of 2.0 mm from one another.

LIST OF REFERENCE CHARACTERS (1) composite pane
(2) functional element
(3) first pane
(4) second pane
(5) thermoplastic intermediate layer
(5.1) first laminating film
(6) carrier film
(7) electrically conductive layer
(8) deaeration structure
(8.1) base surface of the deaeration structure
(8.2) higher-positioned surface sections of the deaeration structure
(9) deaeration channels
AA' section line
K side edges of the composite pane
I outer side of the second pane 4
II inner side of the second pane 4
III inner side of the first pane 3
IV outer side of the first pane 3

The invention claimed is:

1. A composite pane with at least one functional element, comprising:
    a first pane comprising an inner side III and an outer side IV,
    a second pane comprising an inner side II and an outer side I,
    a thermoplastic intermediate layer that joins the inner side III of the first pane laminarly to the inner side II of the second pane,
    at least one functional element that is incorporated into the thermoplastic intermediate layer,
    wherein
    the at least one functional element is directly adjacent the inner side III of the first pane and/or the inner side II of the second pane, and
    a deaeration structure is mounted at least in regions of the at least one functional element, the deaeration structure being directly adjacent (a) the first pane such that no thermoplastic intermediate layer is present in said regions where the deaeration structure is mounted between the at least one functional element and the inner side III of the first pane and/or (b) the second pane such that no thermoplastic intermediate layer is present in said regions where the deaeration structure is mounted between the at least one functional element and the inner side II of the second pane, the deaeration structure preventing the at least one functional element from resting with its entire surface against the inner side II of the second pane and/or the inner side III of the first pane,
wherein the deaeration structure comprises a plurality of deaeration channels each having a width from 1 mm to 5 mm.

2. The composite pane according to claim 1, wherein the deaeration channels run substantially perpendicular to a side edge of the composite pane nearest the at least one functional element.

3. The composite pane according to claim 1, wherein the deaeration structure comprises a regular or irregular structure.

4. The composite pane according to claim 1, wherein the deaeration structure comprises higher-positioned surface regions situated on a base surface and positioned higher in relation to a base surface.

5. The composite pane according to claim 4, wherein the higher-positioned surface regions are positioned offset in height relative to the base surface by at least 15 μm.

6. The composite pane according to claim 4, wherein the higher-positioned surface regions occupy an area proportion of at least 20% of a total area comprising the base surface and higher-positioned surface regions.

7. The composite pane according to claim 1, wherein the deaeration structure is applied additively or subtractively on the at least one functional element, the inner side III of the first pane, and/or the inner side II of the second pane.

8. The composite pane according to claim 7, wherein the deaeration structure is applied additively by printing methods.

9. The composite pane according to claim 7, wherein the deaeration structure is applied subtractively on the at least one functional element.

10. The composite pane according to claim 1, wherein the at least one functional element is an electrically switchable functional element.

11. The composite pane according to claim 1, wherein the at least one functional element has a thickness of at least 50 μm.

12. The composite pane according to claim 1, wherein the thermoplastic intermediate layer has at least one first laminating film comprising polyvinyl butyral, ethylene vinyl acetate, and/or polyurethane with a thickness of 0.30 mm to 1.5 mm.

13. A method for producing a composite pane according to claim 1, comprising:
    a) applying at least one deaeration structure additively or subtractively on at least one functional element,
    b) forming a layer stack at least comprising a first pane, the at least one functional element having a deaeration structure, a thermoplastic intermediate layer, and a second pane, wherein the deaeration structure is directly adjacent the inner side III of the first pane and/or the inner side of the second pane,
    c) laminating the layer stack from step b) to form a composite pane.

14. The method according to claim 13, wherein in step a), a deaeration structure is additively printed or is subtractively produced by laser methods.

15. A method comprising providing a vehicle glazing made with the composite pane according to claim 1.

16. The composite pane according to claim 5, wherein the higher-positioned surface regions are positioned offset in height relative to the base surface by at least 30 μm.

17. The composite pane according to claim 6, wherein the higher-positioned surface regions occupy an area proportion of at most 80% of the total area comprising the base surface and higher-positioned surface regions.

18. The composite pane according to claim 7, wherein the deaeration structure is applied additively or subtractively on the at least one functional element.

19. The composite pane according to claim 8, wherein the deaeration structure is applied additively by screen printing methods or inkjet printing methods.

20. The composite pane according to claim 9, wherein the deaeration structure is applied subtractively on the at least one functional element by laser methods.

* * * * *